(12) United States Patent
Yu et al.

(10) Patent No.: US 12,503,332 B2
(45) Date of Patent: Dec. 23, 2025

(54) SCANNING DEVICE HAVING MOVABLE SCANNING MODULE

(71) Applicant: KINPO ELECTRONICS, INC., New Taipei (TW)

(72) Inventors: Yu-Ying Yu, New Taipei (TW); Pei-Chi Ho, New Taipei (TW); Po-Chih Chang, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 25 days.

(21) Appl. No.: 18/613,729

(22) Filed: Mar. 22, 2024

(65) Prior Publication Data

US 2025/0206566 A1 Jun. 26, 2025

(30) Foreign Application Priority Data

Dec. 22, 2023 (TW) ................................. 112150463

(51) Int. Cl.
*B65H 85/00* (2006.01)
*B65H 7/02* (2006.01)
*B65H 15/00* (2006.01)

(52) U.S. Cl.
CPC ............... *B65H 85/00* (2013.01); *B65H 7/02* (2013.01); *B65H 15/004* (2020.08);
(Continued)

(58) Field of Classification Search
CPC ................. B65H 85/00; B65H 15/004; B65H 2301/311; B65H 2301/433;
(Continued)

(56) References Cited

U.S. PATENT DOCUMENTS 6,563,611 B1 * 5/2003 Kao ................... H04N 1/00745
358/497
6,672,583 B2 * 1/2004 Wei ....................... B65H 15/004
271/186
(Continued)

FOREIGN PATENT DOCUMENTS

| CN | 101588428 A | 11/2009 |
|----|-------------|---------|
| TW | 571561 B | 1/2004 |
| TW | M492010 U | 12/2014 |

OTHER PUBLICATIONS

Office Action dated Jul. 4, 2024 of the corresponding Taiwan patent application No. 112150463.

*Primary Examiner* — Luis A Gonzalez
(74) *Attorney, Agent, or Firm* — HDLS IPR SERVICES; Chun-Ming Shih

(57) ABSTRACT

This disclosure is directed to a scanning device having a which has a tray set, a movable scanning module and an automatic document feeder. The tray set has a feeding tray and a first output tray. The movable scanning module is movable between a first position and a second position. The automatic document feeder has a flip path, a feeding path, an output path, a returnable path and a feeding wheel group. The feeding path is disposed corresponding to the first position and connecting with the feeding tray and the flip path. The output path is disposed corresponding to the second position and connecting with the first output tray. The returnable path has an intersection connecting with the flip path and the output path. The movable scanning module scans two sides of the sheet at the first position and the second position respectively.

11 Claims, 7 Drawing Sheets

(52) U.S. Cl.
CPC .. *B65H 2301/311* (2013.01); *B65H 2301/433* (2013.01); *B65H 2801/39* (2013.01)

(58) Field of Classification Search
CPC ........... H04N 1/00572; H04N 1/00588; H04N 1/00586; H04N 1/0058; H04N 1/00578; G03G 15/232; G03G 15/234
See application file for complete search history.

(56) References Cited

U.S. PATENT DOCUMENTS

| | | | | |
|---|---|---|---|---|
| 7,414,764 | B2 * | 8/2008 | Shyu | H04N 1/00657 355/24 |
| 7,612,925 | B2 * | 11/2009 | Tseng | H04N 1/00572 358/408 |
| 8,995,028 | B2 * | 3/2015 | Kato | H04N 1/00602 399/367 |

* cited by examiner

SCANNING DEVICE HAVING MOVABLE SCANNING MODULE

BACKGROUND OF THE INVENTION

Technical Field

The technical field relates to a scanning device, in particular to a scanning device having a movable scanning module.

Description of Related Art

Related-art machines with scanning functions such as multi-function machines, fax machines, copiers and scanners are common in offices. They have an automatic document feeder (ADF) inside to allow sheets to be input into the machine from a feeding cassette, and then transferred to an operation portion for scanning its front side, and finally send transferred to an output tray to accomplish a single-side scanning to the sheet.

In addition, when the automatic document feeder performs a dual-side scanning, it scans one side of the sheet, then input the sheet into the machine again for flipping, and finally scan a bake side of the sheet at the operation portion.

However, when the back side of the above-mentioned sheet is scanned, for the convenience of the user and maintaining sequence of the sheets, the sheet will be input into the machine the third time for flipping again, and the sheet will be turned to the predetermined face-down condition and transferred to the output tray, so that the sheet input into the machine and output three times and the dual-side scanning is therefore time-consuming.

In views of this, in order to solve the above disadvantage, the inventor studied related technology and provided a reasonable and effective solution in this disclosure.

SUMMARY OF THE INVENTION

This disclosure is directed to a scanning device having a movable scanning module. The movable scanning module is moved between the first position and the second position instead of complex feeding paths, so that the scanning device has a simplified feeding path to perform a more efficient and faster dual-side scanning.

One of the exemplary embodiments, this disclosure is directed to a scanning device having a movable scanning module, which is used for sheet. The scanning device has a tray set having a feeding tray and a first output tray; a movable scanning module disposed movable between a first position and a second position; and an automatic document feeder. The automatic document feeder has a flip path; a feeding path disposed corresponding to the first position and having one end thereof connecting with the feeding tray and another end thereof connected to the flip path; an output path disposed corresponding to the second position and having one end thereof connecting with the first output tray; a returnable path disposed at a side of the feeding path and having an intersection connecting with one end of the flip path away from the feeding path and one end of the output path away from the first output tray; and a feeding wheel group disposed corresponding to the feeding path, the output path and the returnable path. The movable scanning module scans a first side of the sheet at the first position, and scans a second side of the sheet at the second position.

According to the movable scanning module of this disclosure, the scanner catches an image of a first side of the sheet at the first position, and the scanner catch an image of a second side of the sheet at the second position, instead of a complex feeding path. The issue in the related art that the sheet should be input to the scanning device three times is avoid, the scanning device of this disclosure therefore has a simplified feeding path and performs a dual-side scanning more efficient and faster.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Detailed descriptions and technical contents of this disclosure is described in the flowing paragraph with reference to the drawings. However, the drawings are attached only for illustration and are not intended to limit this disclosure.

Figure 1:
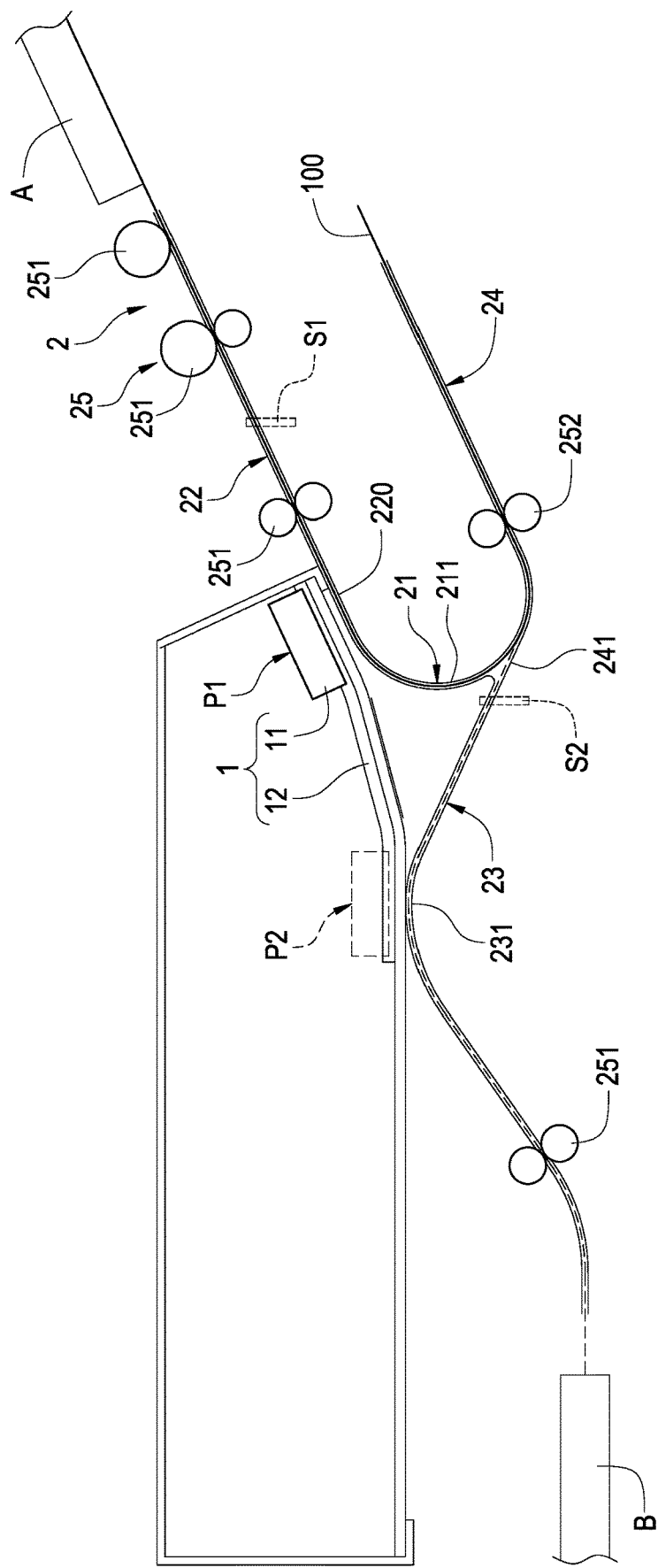
FIG. 1 is a perspective view showing an operation status of a scanning device according to the first embodiment of this disclosure.

Refer to FIG. 1, this disclosure is directed to a scanning device having a movable scanning module, which is used for a sheet 100, this scanning device 10 has a tray set, a movable scanning module 1 and an automatic document feeder (ADF) 2.

According to FIG. 1, the tray set has a feeding tray A and a first output tray B, the movable scanning module 1 is disposed movable between a first position P1 and a second position P2; specifically, the movable scanning module 1 has a scanner 11 and a transmission mechanism 12 connected to the scanner 11 for driving the scanner 11 to move between the first position P1 and the second position P2. Specifically, the scanner 11 is an image capture device such as a video camera or photo camera used for capturing images.

Moreover, the transmission mechanism 12 may be a horizontal linear rail or an inclined linear rail. The horizontal linear rail has a rail disposed horizontally namely that the first position P1 and the second position P2 are disposed at the same vertical height, and the inclined linear rail has a rail disposed obliquely namely that a height difference is defined between the first position P1 and the second position P2.

According to FIG. 1, the automatic document feeder 2 has a flip path 21, a feeding path 22, an output path 23, a returnable path 24 and a feeding wheel group 25. The feeding path 22 is disposed corresponding to the first position P1 and has one end thereof connecting with the feeding tray A and another end thereof connecting with the flip path 21. The output path 23 is disposed corresponding to the second position P2 and has one end thereof connecting with the first output tray B. The returnable path 24 is disposed at a side of the feeding path 22 and has an intersection 241. The intersection 241 is connecting with one end of the flip path 21 away from the feeding path 22 and the end of the output path 23 away from the first output tray B.

Specifically, a curvature between the flip path 21 and the returnable path 24 is defined with a curvature less than another curvature defined at the joint between flip path 21 and the output path 23, the joint between the returnable path and the output path is less than a curvature defined between the returnable path and the flip path. Accordingly, when the sheet 100 is fed from the flip path 21 to the intersection 241, the sheet 100 naturally enter the returnable path 24 with a smaller curvature rather than the output path 23 with a larger curvature.

Furthermore, a curvature between the returnable path 24 and the output path 23 is less than a curvature between the returnable path 24 and the flip path 21. Accordingly, when the sheet 100 is fed from the returnable path 24 to the intersection 241, the sheet 100 naturally enter the output path 23 with a smaller curvature rather than the flip path 21 with a larger curvature.

Moreover, the feeding wheel group 25 is disposed corresponding to the feeding path 22, the output path 23 and the returnable path 24, the feeding wheel group 25 is used for feeding the sheet 100 to move from the feeding tray A to the returnable path 24 by sequentially passing through the feeding path 22, the first position P1 and the flip path 21, and then from the returnable path 24 to the first output tray B by sequentially passing through the output path 23 and the second position P2.

The details are further described follows, the feeding wheel group 25 has a plurality of feeding wheels 251 arranged at the feeding path 22 and the output path 23 and a two-way guiding wheel 252 arranged at the returnable path 24 and disposed adjacent to the intersection 241, the feeding wheel 251 is used for driving the sheet 100 to move forward, and the two-way guiding wheel 252 is used for driving the sheet 100 to move forward or backward.

Additionally, the movable scanning module 1 and the returnable path 24 are disposed opposite to each other at two sides of the feeding path 22 and the output path 23, and the flip path 21 is a C-shaped path 211, so that the sheet 100 is flipped by a C-shape of the C-shaped path 211 when entering.

Furthermore, in an embodiment, the transmission mechanism 12 is disposed above the feeding path 22 and the output path 23, the feeding path 22 has a straight segment 220 disposed at a first position P1. A path in this straight segment 220 is straight without curve. The output path 23 has a reversed U-shaped segment 231 disposed at the second position P2. The reversed U-shaped segment 231 is used for guiding the sheet 100 to approach to the second position P2 and be caught an image by the scanner 11. A height difference is defined between the first position P1 and the second position P2, so that the transmission mechanism 12 is the inclined linear rail.

Specifically, in an embodiment, in order to catch a high-quality image, the transmission mechanism 12 is cooperated with the feeding path 22. Details are further described following, a relatively straight path is defined in the straight segment 220 and the sheet 100 therein is not curved, the scanner 11 therefore can catch a high-quality image. Accordingly, the transmission mechanism 12 is provided with an inclined path cooperated with the straight segment 220 of the feeding path 22 and the reversed U-shaped segment 231 of the output path 23. Although this leads to more complex motion, transmission, and positioning of the movable scanning module 1, and the movable scanning module 1 is therefore more expensive, but the feeding path 22 has the straight segment 220 arranged corresponding to the first position P1 leads to a better quality of the image of the sheet 100 in the feeding path 22 catches by the scanner 11.

According to one embodiment of this disclosure as shown in FIG. 1, the scanning device 10 further has a first position sensor S1 and a second position sensor S2, the first position sensor S1 is installed in the feeding path 22 and disposed in front of the first position P1, the first position sensor S1 is configured to generate a first position signal when detecting the sheet 100, the second position sensor S2 is installed in the output path 23 and disposed in front of the second position P2, the second position sensor S2 generates a second position signal when detecting the sheet 100.

According to one embodiment of this disclosure as shown in FIG. 1, the scanning device 10 further has a processing unit (not shown in FIGS.), the processing unit is electrically connected with the transmission mechanism 12, the first position sensor S1 and the second position sensor S2, the processing unit controls the transmission mechanism 12 to move the scanner 11 to the first position P1 when receiving the first position signal, the processing unit controls the transmission mechanism 12 to move the scanner 11 to the second position P2 when receiving the second position signal.

Specifically, the processing unit may be installed anywhere on the scanning device 10. Alternatively, the processing unit may be a remote-control computer, the processing unit receives the first position signal and the second position signal via a connector or a wireless connection.

Referring to an operated status of the scanning device 10 according to this disclosure as shown in FIG. 1, the sheet 100 has a first side and a second side opposite to each other, the sheet 100 is put in the feeding tray A with the first side up, the feeding wheel 251 in the feeding path 22 feeds the sheet 100 to move from the feeding tray A to the feeding path 22 when the scanning device 10 is scanning, and the first position sensor S1 is configured to generate a first position signal when detecting the sheet 100 passing, the processing unit control the transmission mechanism 12 to move the scanner 11 to the first position P1 when receiving the first position signal, so that the first side of the sheet 100 will be scanned by the scanner 11 to catch an image of the first side when fed to the first position P1, thereby accomplishing a single side scanning.

Then, the feeding wheel 251 in the feeding path 22 feeds the sheet 100 to the flip path 21, the sheet 100 is flipped to turn the second side up when passing the flip path 21 and further fed to the returnable path 24. The two-way guiding wheel 252 in the returnable path 24 firstly moves the sheet 100 into the returnable path 24 entirely and then moves the sheet 100 into the output path 23, and the second position sensor S2 generates a second position signal when detecting the sheet 100 passing. The processing unit controls the transmission mechanism 12 to move the scanner 11 to the second position P2 when receiving the second position signal, so as to feed the sheet 100 to the reversed U-shaped segment 231 namely that the sheet 100 will be scanned by the scanner 11 to catch an image of the second side when fed to the second position P2, thereby accomplishing a single side scanning. Finally, the feeding wheel 251 in the output path 23 feeds the sheet 100 through the output path 23 to the first output tray B.

Accordingly, the scanner 11 has a movable scanning module 1, instead of a complex feeding path. The issue in the related art that the sheet should be input to the scanning device three times is avoid, the scanning device 10 of this disclosure therefore has a simplified feeding path and performs a dual-side scanning more efficient and faster.

Figure 2:
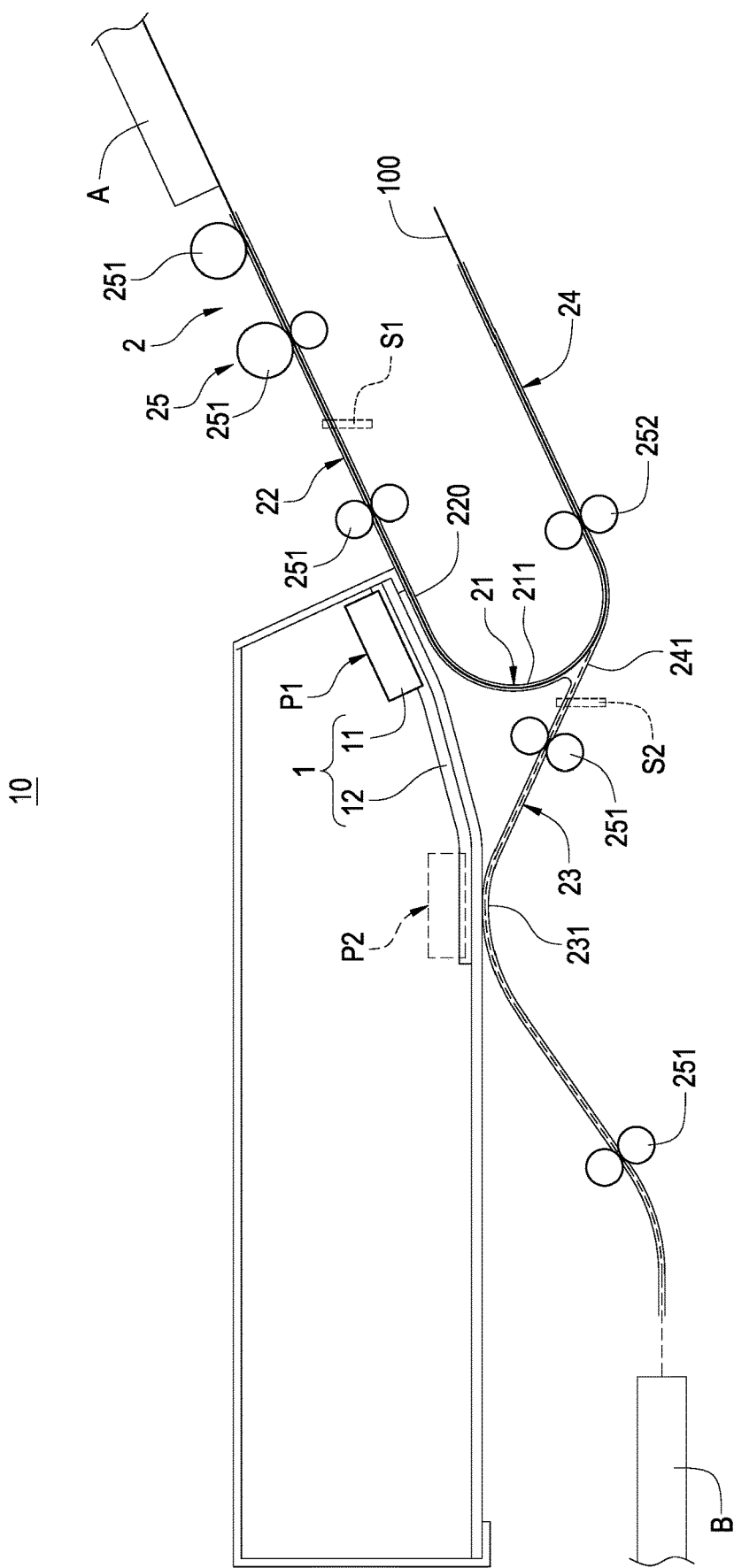
FIG. 2 is a perspective view showing an operation status of a scanning device according to the second embodiment of this disclosure.

Referring to one embodiment of the scanning device 10 of this disclosure as shown in FIG. 2, the embodiment shown in FIG. 2 is approximately the same as the embodiment shown in FIG. 1. FIG. 2 is different from FIG. 1 at that a feeding wheel 251 is additionally arranged in the output path 23. Details are further described following, the feeding wheel 251 is disposed in the output path 23 adjacent to the flip path 21 so that the sheet 100 may be fed to the output path 23 more smoothly.

Figure 3:
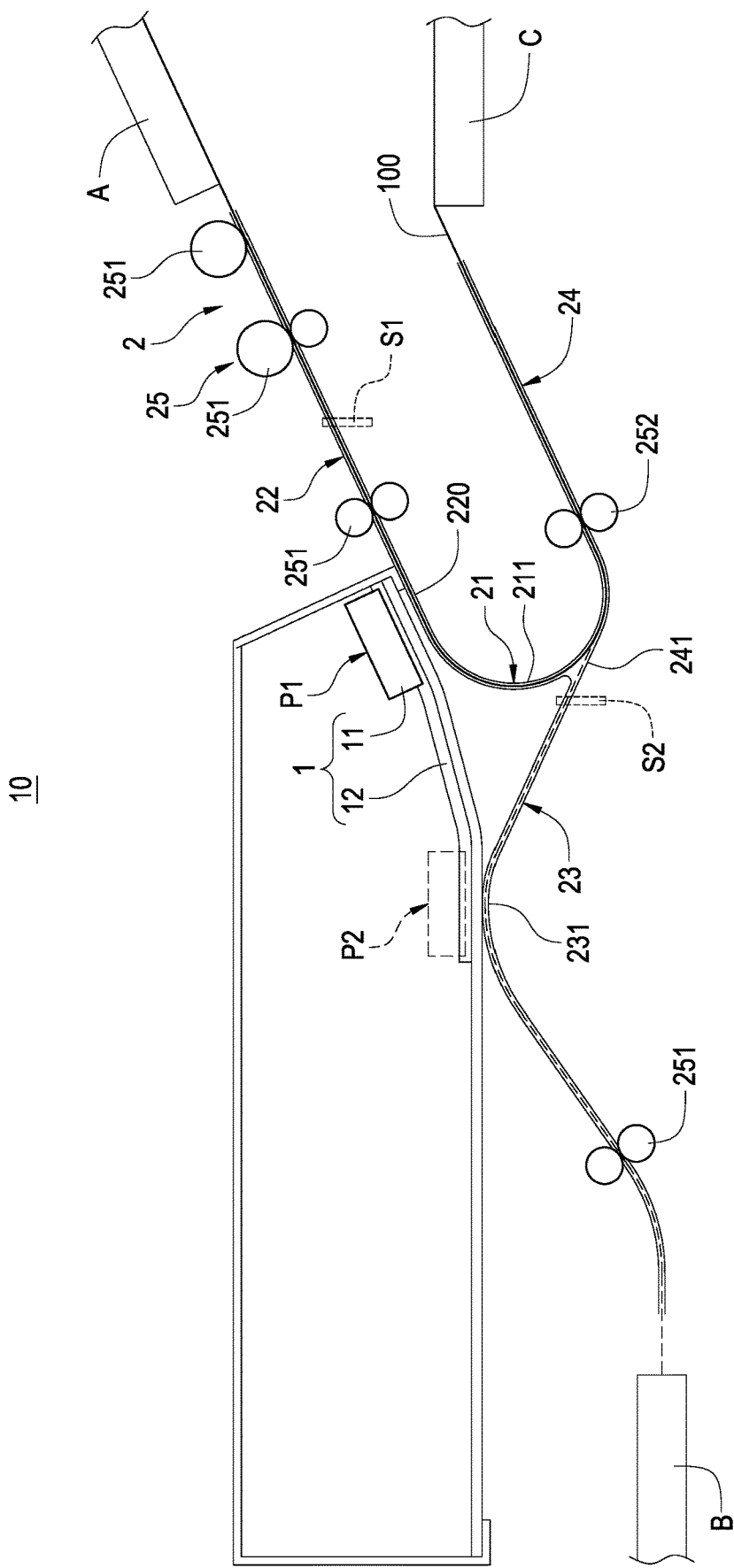
FIG. 3 is a perspective view showing an operation status of a scanning device according to the third embodiment of this disclosure.

Referring to one embodiment of the scanning device 10 of this disclosure as shown in FIG. 3, the embodiment shown in FIG. 3 is approximately the same as the embodiment shown in FIG. 1. FIG. 3 is different from FIG. 1 at that the tray set further has a second output tray C.

Details are further described following, the second output tray C is disposed at one end of the returnable path 24 away from the intersection 241 and connecting with the returnable path 24, so that the sheet 100 only for a single side scanning may be directly fed to the second output tray C through the returnable path 24, instead of the output path 23. The scanning device 10 of this disclosure therefore performs the single side scanning more efficient and faster.

Figure 4:
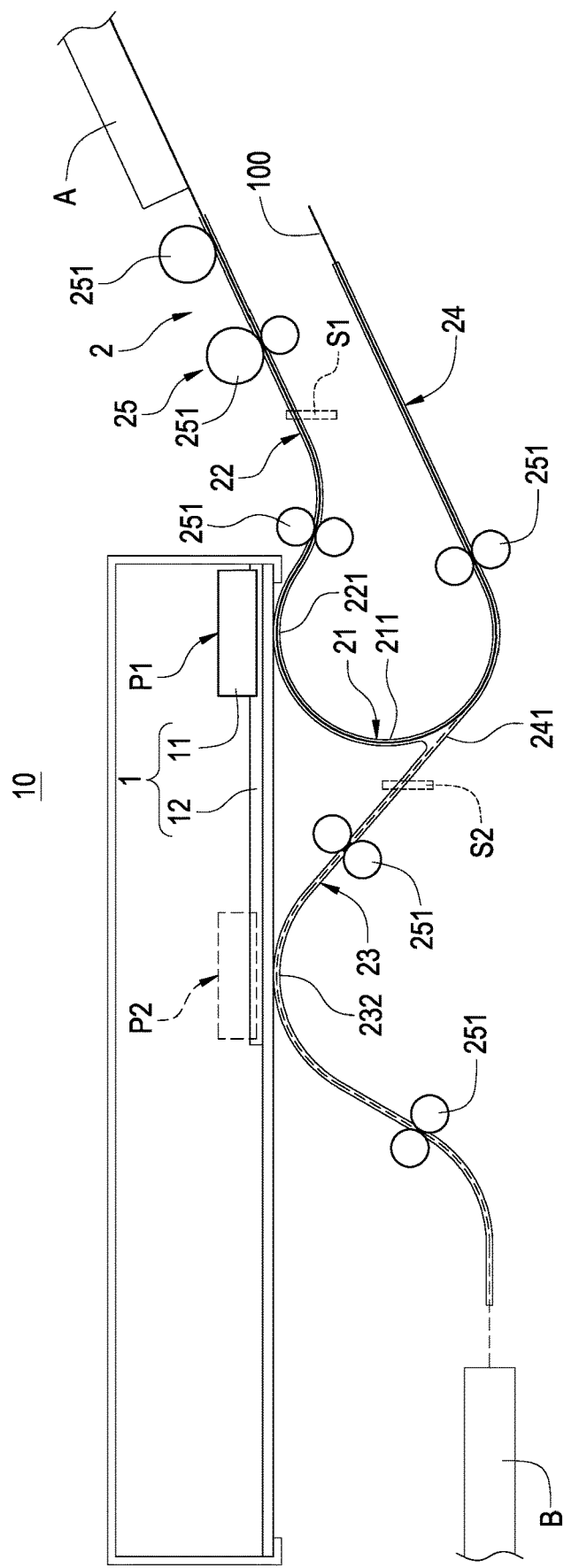
FIG. 4 is a perspective view showing an operation status of a scanning device according to the fourth embodiment of this disclosure.

Referring to one embodiment of the scanning device 10 of this disclosure as shown in FIG. 4, the embodiment shown in FIG. 4 is approximately the same as the embodiment shown in FIG. 1. FIG. 4 is different from FIG. 1 at that the transmission mechanism 12 is a horizontal linear rail.

One of the exemplary embodiments, the transmission mechanism 12 is disposed above the feeding path 22 and the output path 23, the feeding path 22 has a first reversed U-shaped segment 221 disposed convexly toward the first position P1, the first reversed U-shaped segment 221 is configured for guiding the sheet 100 to approach to the first position P1 so as to be scanned by the scanner 11, the output path 23 has a second reversed U-shaped segment 232 disposed convexly toward the second position P2, the second reversed U-shaped segment 232 is configured for guiding the sheet 100 to approach to the second position P2 so as to be scanned by the scanner 11. Accordingly, first position P1 and the second position P2 are disposed at the same vertical height, and the transmission mechanism 12 is a horizontal linear rail.

Specifically, in an embodiment, in order to reduce cost of manufacturing the movable scanning module 1, the feeding path 22 is cooperated with the transmission mechanism 12. Details are further described following, the feeding path 22 has the first reversed U-shaped segment 221 for guiding the sheet 100 to approach to the first position P1, so that an over tilted path is not necessary to be disposed in the transmission mechanism 12 for approaching to the feeding path 22, and this leads to simple movement, transmission and positioning of the movable scanning module 1, the cost for manufacturing the movable scanning module 1 could be reduced therefore. However, the feeding path 22 has the first reversed U-shaped segment 221 disposed corresponding to the first position P1, the sheet 100 will be curved when passing the first reversed U-shaped segment 221, so that the scanner 11 will catch an image of the sheet 100 in the feeding path 22 with a lower quality, and an additional height of the scanning device 10 will caused by the first reversed U-shaped segment 221 of the feeding path 22.

Figure 5:
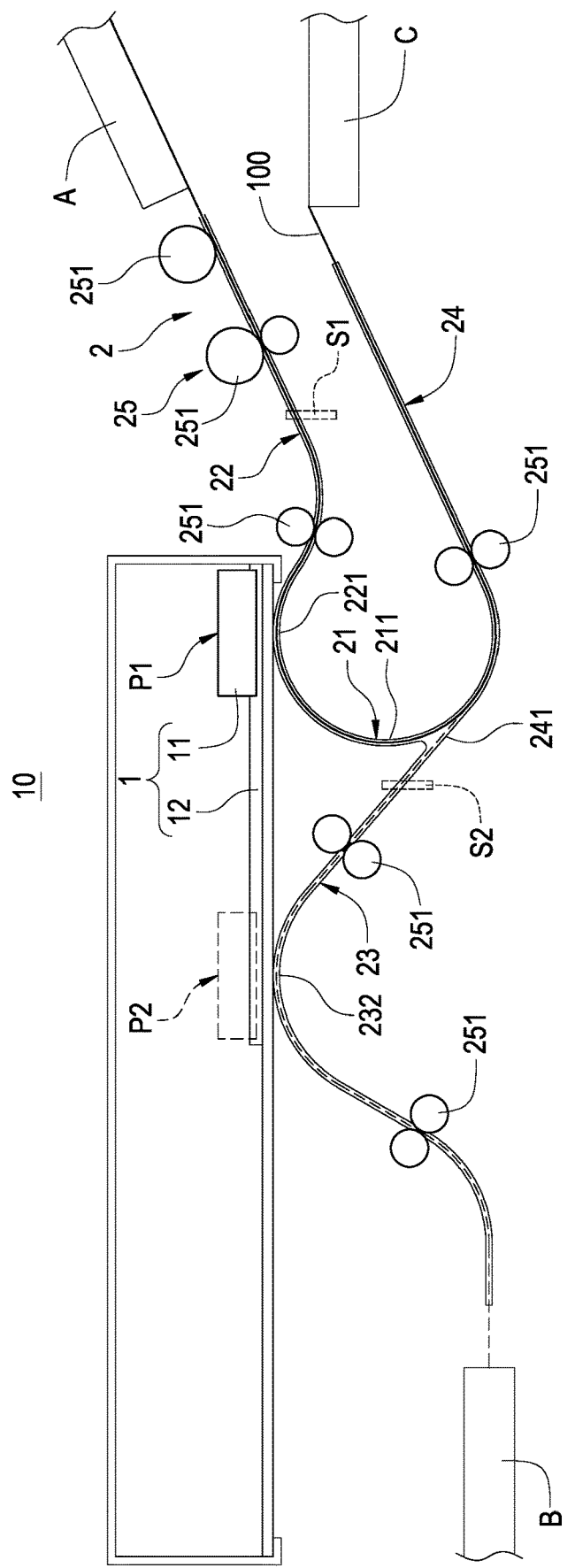
FIG. 5 is a perspective view showing an operation status of a scanning device according to the fifth embodiment of this disclosure.

Referring to one embodiment of the scanning device 10 of this disclosure as shown in FIG. 5, the embodiment shown in FIG. 5 is approximately the same as the embodiment shown in FIG. 4. FIG. 5 is different from FIG. 4 at that the tray set further has a second output tray Cm the second output tray C is disposed at one end of the returnable path 24 away from the intersection 241 and connecting with the returnable path 24, so that the sheet 100 only for a single side scanning may be directly fed to the second output tray C through the returnable path 24, the scanning device 10 of this disclosure therefore performs the single side scanning more efficient and faster.

Figure 6:
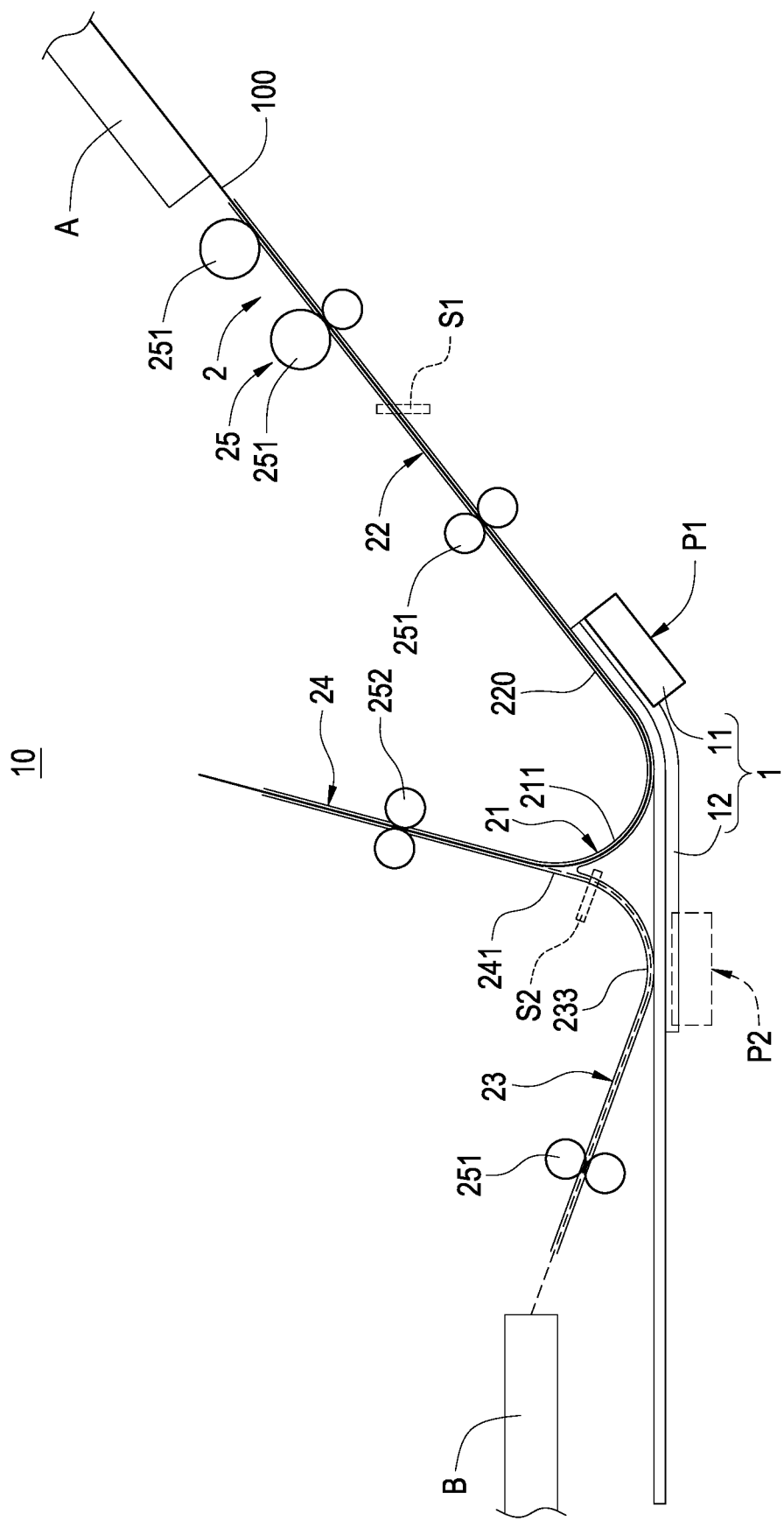
FIG. 6 is a perspective view showing an operation status of a scanning device according to the seventh embodiment of this disclosure.

Referring to one embodiment of the scanning device 10 of this disclosure as shown in FIG. 6, the embodiment shown in FIG. 6 is approximately the same as the embodiment shown in FIG. 1. FIG. 6 is different from FIG. 4 at that the movable scanning module 1 is disposed below the feeding path 22 and the output path 23.

According to this embodiment, the transmission mechanism 12 is disposed below the feeding path 22 and the output path 23, the feeding path 22 has a straight segment 220 disposed at the first position P1, a path in this straight segment 220 is straight without curve. The output path 23 has a U-shaped segment 233 disposed convexly toward the second position P2, the U-shaped segment 233 is configured for guiding the sheet 100 to approach to the second position P2 so as to be scanned by the scanner 11. A height difference is defined between the first position P1 and the second position P2, so that the transmission mechanism 12 is the inclined linear rail.

Specifically, in an embodiment, in order to catch a high-quality image, the transmission mechanism 12 is cooperated with the feeding path 22. Details are further described following, a relatively straight path is defined in the straight segment 220 and the sheet 100 therein is not curved, the scanner 11 therefore can catch a high-quality image. Accordingly, the transmission mechanism 12 is provided with an inclined path cooperated with the straight segment 220 of the feeding path 22 and the U-shaped segment 233 of the output path 23. Although this leads to more complex motion, transmission, and positioning of the movable scanning module 1, and the movable scanning module 1 is therefore more expensive, but the feeding path 22 has the straight segment 220 arranged compassioning to the first position P1 leads to a better quality of the image of the sheet 100 in the feeding path 22 catches by the scanner 11.

Figure 7:
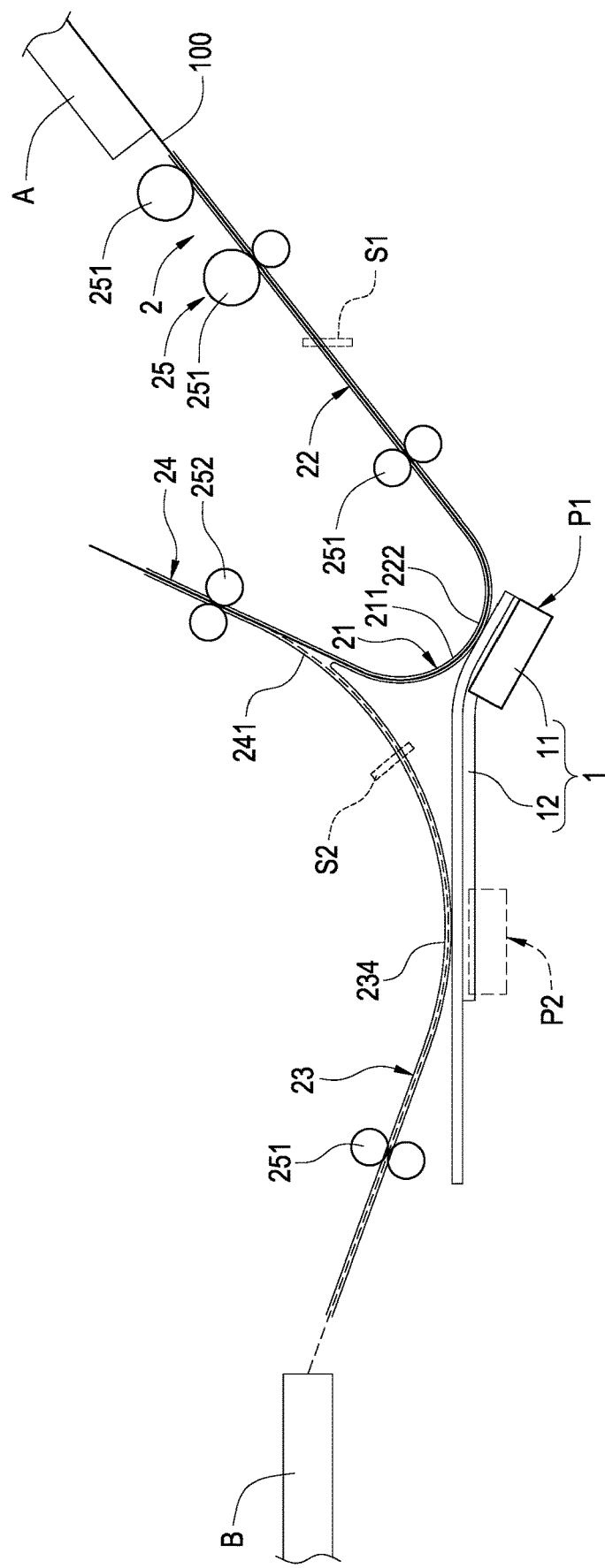
FIG. 7 is a perspective view showing an operation status of a scanning device according to the eighth embodiment of this disclosure.

Referring to one embodiment of the scanning device 10 of this disclosure as shown in FIG. 7, the embodiment shown in FIG. 7 is approximately the same as the embodiment shown in FIG. 6. FIG. 7 is different from FIG. 6 at that the second U-shaped segment 234 has a smoother curvature.

According to this embodiment, the transmission mechanism 12 is disposed below the feeding path 22 and the output path 23, the feeding path 22 has a first U-shaped segment 222 disposed at the first position P1, the first U-shaped segment 222 is configured for guiding the sheet 100 to approach to the first position P1 so as to be scanned by the scanner 11, the output path 23 has a second U-shaped segment 234 disposed convexly toward the second position P2, the second U-shaped segment 234 is configured for guiding the sheet 100 to approach to the second position P2 so as to be scanned by the scanner 11. Accordingly, a height difference between the first position P1 and the second position P2 is less than the height difference between the first position P1 and the second position P2 as shown in FIG. 6. According to this embodiment, the second U-shaped segment 234 has a curvature at the second position P2 less than a curvature of the U-shaped segment 233 at the second position P2 as shown in FIG. 6.

Specifically, in this embodiment, in order to reduce the curvature of the second U-shaped segment 234, the feeding path 22 is cooperated with the transmission mechanism 12. Details are further described following. Details are further described following, the feeding path 22 has the first U-shaped segment 222 for guiding the sheet 100 to approach to the first position P1, so as to reduce a height difference between the first position P1 and the second position P2, so that an over curved path is not necessary to be disposed in the second U-shaped segment 234 for approaching to the second position P2, and this leads to simple movement, transmission and positioning of the movable scanning module 1, the cost for manufacturing the movable scanning module 1 could be reduced therefore. Since the second U-shaped segment 234 has a smaller curvature, the scanner 11 may catch an image of the sheet 100 in the second U-shaped segment 234 with a better quality. However, the feeding path 22 has the first U-shaped segment 222 disposed corresponding to the first position P1, the sheet 100 will be curved when passing the first U-shaped segment 222, so that the scanner 11 will catch an image of the sheet 100 in the feeding path 22 with a lower quality.

Accordingly, the printing device and the portable sheet cassette thereof according to this disclosure achieve expected purposes for using and improve related arts, and therefore novel, non-obvious and useful so as to meet the requirements of patentability. The applicant here files an application in accordance with the Patent Law and respectfully request for carefully examining and granting the application in order to protect the rights of the inventor.

What is claimed is:

1. A scanning device, used for a sheet, the scanning device comprising:
    a tray set, comprising a feeding tray and a first output tray;
    a movable scanning module, disposed movably between a first position and a second position; and
    an automatic document feeder, comprising:
    a flip path;
    a feeding path, disposed corresponding to the first position, one end thereof connecting with the feeding tray and another end thereof connecting with the flip path;
    an output path, disposed corresponding to the second position, and one end thereof connecting with the first output tray;
    a returnable path, arranged at a side of the feeding path and comprising an intersection, the intersection connecting with one end of the flip path away from the feeding path and one end of the output path away from the first output tray; and
    a feeding wheel group, disposed corresponding to the feeding path, the output path and the returnable path,
    wherein the movable scanning module is configured to scan a first side of the sheet when being located at the first position and is configured to scan a second side of the sheet when being located at the second position;
    wherein the movable scanning module comprises a scanner and a transmission mechanism connected to the scanner and driving the scanner to move between the first position and the second position;
    wherein the movable scanning module and the returnable path are disposed at two sides of the feeding path and the output path opposite to each other, the flip path is a C-shaped path, and the transmission mechanism is a horizontal linear rail or an inclined linear rail.

2. The scanning device according to claim 1, wherein the sheet is fed by the feeding wheel group to move from the feeding tray to returnable path by sequentially passing through the feeding path, the first position and the flip path, and further move from the returnable path to the first output tray by sequentially passing through the output path and the second position.

3. The scanning device according to claim 1, further comprising a first position sensor and a second position sensor, wherein the first position sensor is arranged at the feeding path and disposed at front of the first position, the first position sensor is configured to generate a first position signal when detecting the sheet, the second position sensor is arranged at the output path and disposed at front of the second position, the second position sensor is configured to generate a second position signal when detecting the sheet.

4. The scanning device according to claim 3, further comprising a processing unit, wherein the processing unit is electrically connected with the transmission mechanism, the first position sensor and the second position sensor, the processing unit is configured to control the transmission mechanism to move the scanner to the first position when receiving the first position signal, and the processing unit is configured to control the transmission mechanism to move the scanner to the second position when receiving the second position signal.

5. The scanning device according to claim 1, wherein the transmission mechanism is the inclined linear rail when the transmission mechanism is disposed above the feeding path and the output path, the feeding path comprises a straight segment extended toward the first position, and the output path comprises a reversed U-shaped segment disposed convexly toward the second position.

6. The scanning device according to claim 1, wherein the transmission mechanism is a horizontal linear rail when the transmission mechanism is disposed above the feeding path and the output path, the feeding path comprises a first reversed U-shaped segment disposed convexly toward the first position, and the output path comprises a second reversed U-shaped segment disposed convexly toward the second position.

7. The scanning device according to claim 1, wherein the transmission mechanism is disposed below the feeding path and the output path, the feeding path comprises a straight segment disposed at the first position, the output path comprises a U-shaped segment disposed at the second position.

8. The scanning device according to claim 1, wherein the transmission mechanism is disposed below the feeding path and the output path, the feeding path comprises a first U-shaped segment disposed at the first position, the output path comprises a second U-shaped segment disposed at the second position.

9. The scanning device according to claim 1, wherein a curvature of a first connecting path between the flip path and the returnable path is lower than a curvature of a second connecting path between the flip path and the output path, and a curvature of a third connecting path between the returnable path and the output path is lower than the curvature of the first connecting path between the flip path and the returnable path.

10. The scanning device according to claim 1, wherein the feeding wheel group further comprises a plurality of feeding wheels arranged at the feeding path and the output path and a two-way guiding wheel arranged at the returnable path and disposed adjacent to the intersection.

11. The scanning device according to claim 1, wherein the tray set further comprises a second output tray, the second output tray is disposed at one end of the returnable path away from the intersection and connecting with the returnable path.

* * * * *